United States Patent
Kawai et al.

(10) Patent No.: US 7,872,795 B2
(45) Date of Patent: Jan. 18, 2011

(54) LAMINATED BODY FOR OPTICAL PURPOSES THAT INCLUDES A MELANIN-CONTAINING LAYER AND AN OPTICAL PRODUCT WHICH INCLUDES THE LAMINATE

(75) Inventors: Ryozo Kawai, Tokorozawa (JP); Yoshiyuki Aoki, Tokorozawa (JP); Eiko Aoki, legal representative, Iruma (JP); Masahiko Namiki, Tokorozawa (JP); Mitsuo Miura, Tokorozawa (JP)

(73) Assignee: MGC Filsheet Co., Ltd., Saitama (JP)

( * ) Notice: Subject to any disclaimer, the term of this patent is extended or adjusted under 35 U.S.C. 154(b) by 966 days.

(21) Appl. No.: 11/710,398

(22) Filed: Feb. 26, 2007

(65) Prior Publication Data

US 2009/0323179 A1  Dec. 31, 2009

(30) Foreign Application Priority Data

Feb. 24, 2006  (JP) .............................. 2006-048431

(51) Int. Cl.
*G02B 5/22* (2006.01)
*G02C 7/10* (2006.01)

(52) U.S. Cl. ...................... 359/352; 359/359; 359/361; 351/163; 252/589

(58) Field of Classification Search ................. 252/589; 359/352, 359, 361; 351/163
See application file for complete search history.

(56) References Cited

U.S. PATENT DOCUMENTS

| 7,119,873 | B2 * | 10/2006 | Kawanishi et al. | 349/194 |
| 7,393,907 | B2 * | 7/2008 | Imuta et al. | 526/281 |
| 2004/0145701 | A1 * | 7/2004 | Miniutti et al. | 351/159 |
| 2004/0145802 | A1 * | 7/2004 | Miniutti et al. | 359/356 |
| 2006/0039070 | A1 | 2/2006 | Sugimura et al. | |

FOREIGN PATENT DOCUMENTS

| EP | 0311290 A2 | 4/1989 |
| JP | 08-500371 A | 1/1996 |
| JP | 2002-533516 A | 10/2002 |
| WO | 00/37563 A1 | 6/2000 |

OTHER PUBLICATIONS

European Search Report corresponding to European Patent Application No. 07102810.4, dated Feb. 10, 2010.

* cited by examiner

*Primary Examiner*—Thao T. Tran
(74) *Attorney, Agent, or Firm*—Sughrue Mion, PLLC

(57) ABSTRACT

A laminated body of the present invention includes a melanin-containing layer, wherein the melanin-containing layer is formed by curing a composition that includes at least a melanin, a polymerizable monomer, and a urethane-derived composition. The composition for the laminated body of the present invention is used for producing the laminated body and includes at least a melanin, a polymerizable monomer, and a urethane-derived composition. The optical product of the present invention is formed including the laminated body.

15 Claims, No Drawings

LAMINATED BODY FOR OPTICAL PURPOSES THAT INCLUDES A MELANIN-CONTAINING LAYER AND AN OPTICAL PRODUCT WHICH INCLUDES THE LAMINATE

FIELD OF THE ART

The present invention relates to a laminated body for optical purposes which includes a melanin-containing layer and an optical product which includes the laminate. In particular, the invention relates to a laminated body for optical purposes which includes a melanin-containing layer and an optical product which includes the laminate, of which the melanin concentration is high, and which are excellent in the capacity to protect eyes from ultraviolet rays.

BACKGROUND OF THE ART

Melanin exists widely in the world of animals and plants. It is known that it protects eyes and skin from harmful ultraviolet rays through absorbing them. Conventionally, it is known that a synthetic melanin (other than the melanin which exists in the world of animals and plants) is obtained by oxidizing a melanin precursor, such as a catechol, etc., in an aqueous solution. So, it has been expected that a melanin-containing laminated body for optical purposes which can protect eyes from ultraviolet rays by using these characteristics of melanin would be developed.

Conventionally, methods for producing a water-soluble melanin that is obtained by oxidizing a melanin precursor, such as a catechol, etc., in an aqueous solution, have been disclosed. (See References 1 and 2 below.)

A use as a functional film has been proposed by extracting the melanin, obtained as above, in the presence of salts with an organic solvent. (See Reference 1 below.)

Reference 1: Official Gazette of Japanese Patent Early-publication (Kokai No. Hei.

Reference 2: Official Gazette of Japanese Patent Early-publication (Kokai No.

DISCLOSURE OF THE INVENTION

Problems to be Solved

However, melanin is essentially water-soluble. Its solubility in an organic solvent is low. So by the method of Reference 1 it is impossible to prepare a solution with a high level of melanin even by a procedure to concentrate it, etc. Thus, there have been problems such that a complex step is necessary for producing a functional film that includes a high level of melanin. For example, complicated procedures such as two coatings, or three coatings, etc. are necessary for it.

Since the melanin obtained as above is water-soluble, the inventors of this invention have developed a method for immersing a polyvinyl alcohol film with a high hydrophilic property in an aqueous solution which has been prepared by dissolving the melanin in water (referred to as an "Immersing Method"). By this method, polymer films impregnated with the melanin can be produced.

However, the use of a hydrophilic film is necessary for this Immersing Method. So there is a problem in that the method cannot be used with polymer films which have no or insufficient hydrophilic properties.

Also, though conventional methods for immersing have an advantage in that they can treat continuously, they have a deficit in that an immersing liquid ages during the procedure, because of the accumulation of waste matter in the immersing liquid. Thus, there is also a problem in that the method takes money, time, and labor, because it is necessary to periodically discard the immersing liquid and to prepare new liquid.

In contrast, the inventors of this invention have produced a laminated body for optical purposes with both a polarizing property and photochromic property by laminating a polarizing layer and a photochromic layer, and have developed a functional film by using the laminate. However, this method has no technical idea wherein melanin is included for protecting eyes. Further, it has a problem of being unable to dissolve the melanin.

The present invention has been performed considering those problems. The purpose of the invention is to provide a laminated body for optical purposes which includes a melanin-containing layer and an optical product which includes the laminate, in particular, to provide a laminated body for optical purposes which includes a melanin-containing layer and an optical product which includes the laminate. The melanin concentration of them is high. They are excellent in the capacity to protect eyes from ultraviolet rays.

Means for Solving the Problems

Namely, the present invention is based on the above technical idea. It provides the following inventions as concrete embodiments.

[1] A laminated body for optical purposes comprising a melanin-including layer, wherein said melanin layer is formed by curing a composition that comprises a melanin, a polymerizable monomer, and a urethane-derived composition.

[2] A laminated body for optical purposes according to [1], wherein the content of the melanin of the melanin layer is 1.5% or more by weight.

[3] A laminated body for optical purposes according to [1] or [2], wherein said melanin is any one selected from the group consisting of an eumelanin, a pheomelanin, and an allomelanin.

[4] A laminated body for optical purposes according to [1]-[3], wherein said polymerizable monomer is a (meth)acrylate ester or an acroyl monomer.

[5] A laminated body for optical purposes according to [4], wherein said (meth)acrylate ester is at least any one selected from the group consisting of a tetrahydrofuryl (meth)acrylate, a glycidyl (meth)acrylate, a 3-hydroxypropyl (meth)acrylate, and a 2-hydroxypropyl (meth)acrylate.

[6] A laminated body for optical purposes according to [4], wherein said acroyl monomer is N-acroylmorphorine or N-acroyl-2-pyrrolydone or both.

[7] A laminated body for optical purposes according to [1]-[6], wherein the urethane-derived composition is a thermocurable composition which consists of a polyurethane polymer and a curing agent.

[8] A laminated body for optical purposes according to [1]-[7] that consists of a melanin layer, and two transparent resin layers between which the melanin layer is held.

[9] A laminated body for optical purposes according to [1]-[7] that consists of a polarizing film, a melanin layer, and a photochromic layer between which the polarizing film is held, and two transparent resin layers between which the melanin layer and the photochromic are held.

[10] A laminated body for optical purposes according to [8] or [9], wherein the transparent resin layers are at least one selected from the group consisting of a polycarbonate resin, a cellulose resin, an alicyclic polyolefin resin, and a polyester resin.

[11] A laminated body for optical purposes according to [8] or [9], wherein the transparent resin layers are polycarbonate resins.

[12] A composition for producing the laminated body for optical purposes according to [1]-[11], wherein the composition comprises at least one of a melanin, a polymerizable monomer, and a urethane composition.

[13] A composition for producing the laminated body for optical purposes according to [12], wherein the melanin is any one selected from the group consisting of an eumelanin, a pheomelanin, and an allomelanin.

[14] A composition for producing the laminated body for optical purposes according to [12] or [13], wherein the polymerizable monomer is a (meth)acrylic acid ester or an acroyl monomer.

[15] A composition for producing the laminated body for optical purposes according to [12]-[14], wherein the urethane composition is a thermal curable composition which consists of a polyurethane polymer and a curing agent.

[16] A melanin-containing optical product which is formed such that it includes the laminated body for optical purposes of any one Claims [1]-[11].

[17] A melanin-containing optical product according to [16] which is any one selected from the group consisting of a polarizing lens, a polarizing plate, sunglasses, goggles, glass for automobiles, window glass, and a sunvisor.

Effects of the Invention

The laminated body for optical purposes of the invention may include a high level of melanin. So it can provide optical products which are excellent in protecting eyes from ultraviolet rays.

MOST PREFERABLE EMBODIMENT FOR THE INVENTION

The embodiments of this invention are explained below.

A laminated body for optical purposes of the present invention include melanin-containing layer(s), wherein the melanin layers are formed with a composition to be cured consisting of a melanin, a polymerizable monomer, and a urethane composition. Using the mixture of the polymerizable monomer and the urethane composition enables melanin to be soluble at a high concentration. Also, by using an adhesive melanin-containing layer as the mixture of the polymerizable monomer and the urethane composition that includes a high level of melanin, a laminated body for optical purposes which is, excellent in protecting eyes from ultraviolet rays can be formed.

A variety of natural and synthetic melanins can be used as the melanin. An artificially synthesized melanin is preferably used from the viewpoint of cost. Illustrative examples include an eumelanin, a pheomelanin, an allomelanin, the derivatives thereof, etc.

To aid the capability to absorb ultraviolet rays, ultraviolet-absorbing materials, such as salicylates, benzophenones, benzotriazoles, cyanoacrylates, hindered amines, etc., can be added to the melanin.

For the polymerizable monomer, a (meth)acrylic acid ester and an acroyl monomer are preferable. Also, oligomers thereof with polymerization degree of about 2-10 can be used. If the degree is too high, the solubility of the melanin becomes low, so it is not preferable.

Examples of the (meth)acrylic acid ester include, for example, a (meth)acrylic tetra hydrofurfuryl, a (meth)acrylic glycidyl, a (meth)acrylic acid-3-hydroxypropyl, a (meth) acrylic acid-2-hydroxypropyl, etc.

Examples of the acroyl monomer include, for example, a N-acroylmorfoline, a N-acroyl-2-pyroridone, etc.

Examples of the urethane composition include, for example, a two-liquid-type thermocurable composition, such as a polyurethane polymer.

For the polyurethane polymer, a compound which is a product of a diisocyanate compound reacting with a polyoxyalkylenediol at a fixed ratio, which has isocyanate groups at both of the ends, is preferable.

For the diisocyanate compound, for example, a diphenylmethane-4,4'-disocyanate, a tolylene diisocyanate, a hexamethylene diisocyanate, an isophorone disocyanate, a 4,4'-dicyclohexylmethane diisocyanate, a lysine isocyanate, and a hydrated xylene diisocyanate, may be listed. Among these, a diphenylmethane-4,4'-disocyanate is preferable.

For the polyoxyalkylenediol, for example, a polypropyrene glycol, a polyethylene glycol, and a polyoxytetramethylene glycol may be listed. Among these, a polypropyrene glycol that has polymerization degree of 5-30 is preferable.

The molecular weight of the polyurethane polymer is a number average molecular weight of 500-5000, preferably 1500-4000, and more preferably 2000-3000. Herein the number average molecular weight is referred to as average molecular weight determined by methods such as an end-group determining method, an ebullioscopic method, a cryoscopic method, an osmotic pressure method, gel permeation chromatography, etc.

The curing agent may be any compound which has two or more hydroxyl groups, without any limitation. Such a compound includes, for example, a polyurethane polyol, a polyether polyol, a polyester polyol, an acryl polyol, a polybutadiene polyol, a polycarbonate polyol, etc. Among these, a polyurethane polyol that is obtained from a particular isocyanate and a particular polyol and that has a hydroxyl group at its end is preferable. Particularly, a polyurethane polyol, which is obtained from a diisocyanate compound and a polyol, is more preferable.

Examples of the diisocyanate compound for the curing agent include, for example, a diphenylmethane-4,4'-diisocyanate, a tolylene diisocyanate, a hexamethylene diisocyanate, an isophorone diisocyanate, a 4,4'-dicyclohexylmethene diisocyanate, a lysine isocyanate, and a hydrated xylene diisocyanate. Among these, a tolylene diisocyanate is preferable.

Examples of the polyols for the curing agent include, for example, a compound obtained by reacting a trimethylolpropane, etc., with an ethylene oxide or an propyrene oxide. Among these, a polypropyreneglycol derivative that has polymerization degree of 5-30 is preferable.

The molecular weight of the curing agent is a number average molecular weight of 500-5000, preferably 1500-4000, and more preferably 2000-3000.

Solvents such as an ethyl acetate and a tetrahydrofuran can be added to the polyurethane polymer and the curing agent to adjust the viscosity of the composition. The use of these solvents is particularly effective for homogeneously dispersing a photochromic compound in a urethane resin.

For the mixing ratio of the polymerizable monomer in relation to the urethane-derived composition, 10-80% of the monomer is used. If the monomer ratio is 10% or less, the solubility of the melanin becomes low. If it is 80% or more, the adhesive capacity of the laminated body becomes weak.

The thickness of the layer consisting of the polymerizable monomer and the urethane-derived composition is preferably about 10-200 microns. If the thickness is too little, the adhesive capacity of the laminated body becomes weak. If it is too great, the light transmittance becomes low because of components such as melanin, a photochromic dye, etc.

If a synthetic melanin such as an eumelanin, a pheomelanin, and an allomelanin is used as the melanin, the melanin content of the melanin layer is about 1.0 weight % or more. The content of the melanin is preferably about 1.5 weight % or more from the viewpoint of reducing the absorption of ultraviolet rays.

Examples of the laminated body for optical purposes of the present invention include, for example, a laminated body consisting of a melanin layer and two transparent resin layers between which the melanin layer is held, and a laminated body consisting of a polarizing film, a melanin layer, and a photochromic layer between which the polarizing film is held, and two transparent resin layers between which the melanin layer and the photochromic layer are held, etc.

For the polarizing film used for the laminated body for optical purposes, any polarizing sheet formed of a given resin may essentially be used without any limitation, if the sheet has some heat durability. Such a polarizing sheet is preferably formed, for example, of a polyvinylalcohol-derived resin.

For the polyvinyl alcohol-derived resin, any ordinary polyvinyl alcohol-derived film can be used without limitation. Examples of these polyvinyl alcohol-derived resins include, for example, a polyvinyl alcohol resin, a poly (ethylene-vinyl acetate) copolymer resin, a polyvinyl butylal resin, a polyvinyl acetal resin, etc. Among these polyvinyl alcohol-derived resins, the polyvinyl alcohol resin is preferable.

The thickness of the polarizing film is not specifically limited. But, if it is thin, it is easily teared. If it is thick, the light transmittance of it decreases. So, the thickness is preferably about 10-50 microns.

For the polarizing film, one comprising a dichroic dye is preferable because it is excellent in thermal resistance. For example, for the polyvinyl alcohol resin, the resin can be dyed by immersing it while warming it at from room temperature to 50° C. in a dichroic dye.

Examples of the dyes for producing the polarizing film include, for example, Chrysophenine (C.I.24895), Chlorantine Fast Red (C.I.28160), Sirius Yellow (C.I.29000), Benzopurpurine (C.I.23500), Direct Fast Red (C.I.23630), Brilliant Blue B (C.I.24410), Chlorazol Black BH (C.I.22590), Direct Blue 2B (C.I.22610), Direct Sky Blue (C.I.24400), Diamine Green (C.I.30295), Solophenyl Blue 4GL (C.I.34200), Direct Copper Blue 2B (C.I.24185), Nippon Brilliant Violet BK conc (C.I.27885), Congo Red (C.I.22120), Acid Black (C.I.20470), etc. Among these dyes, two or more dyes can be selected to be used according to the purpose. Within the above parentheses the Color Index Nos. are shown from the *Manual of Dyes, New Edition*, edited by The Association of Organic Synthesis, Maruzen Co. Ltd., 1970.

The polarizing film may be treated with a metal compound and boric acid to further provide thermal resistance and anti-solvent activity.

For the photochromic compound as a photochromic dye, used for the laminated body for optical purposes, any commercially available organic photochromic compound may be used without any specific limitation, if its affinity is good. Among these, spirobenzopyrane derivatives, naphthopyrane derivatives, and spiro-oxazine derivatives are preferable because of their good photochromic capability. Among these organic photochromic compounds, in particular spiro-oxazine compounds are preferable because of their good light resistance.

Further, for securing the lifespan of the photochromic dye, a hindered amine-derived light-stabilizer and an antioxidant such as a hindered phenol, etc., can be added as a stabilizer.

The transparent resin for the laminated body for optical purposes is not particularly limited if it essentially has only some heat durability. Preferably for the resin, a polycarbonate-derived resin, a cellulose-derived resin, an alicyclic polyolefin-derived resin, a non-crystalline polyolefin-derived resin, a polyacrylate-derived resin, a polysulfon-derived resin, a triacetylcellulose-derived resin, polyester-derived resin, etc., can be listed. Among these, a variety of polycarbonate resins, a cellulose acetate represented by TAC, a propylcellulose, a cellulose-derived resin such as a cellulose acetate and a cellulose butyrate, a variety of acryl-derived resins, a polyethylene naphthalate or a polyethylene telephthalate, a fluorine-derived polyester resin which has an excellent optical property, and an alicyclic olefin-derived resin represented by "ARTON," "Zeonoa," and "APEL," are preferable. A polycarbonate-derived resin is more preferable from the viewpoints of mechanical strength and thermal resistance.

If the thickness of the transparent resin is too little, its mechanical strength becomes weak. If it is too great, its processability becomes worse. So, it is preferably about 20 microns-2 mm.

The composition for the laminated body for optical purposes is one to be used for producing the above laminated body. It is characterized by including a melanin, a polymerizable monomer, and a urethane composition. The melanin is preferably one selected from the group consisting of an eumelanin, a pheomelanin, and an allomelanin. The polymerizable monomer is preferably a (meth)acrylic acid ester or an acroyl monomer. The urethane-derived composition is preferably a thermal curable composition which consists of a polyurethane polymer and a curing agent.

The melanin, the polymerizable monomer, and the urethane composition that are used for the composition for the laminated body of the present invention are the same as those in the laminated body for optical purposes of the present invention.

The optical product of the present invention is characterized by being formed while including the above laminated body. For this optical product, a polarizing lens, a polarizing plate, sunglasses, goggles, glass for automobiles, window glass, a sunvisor, etc., can be listed.

EXAMPLES

The present invention is described in detail in the following Examples and Comparative examples, but the invention should not be limited by the descriptions thereof.

Example for Producing 1

Producing a Eumelanin

To a 1 L reactor equipped with a stirrer and an exit for overflow 200 g/L of catechol and 500 g/L of sodium persulfate were provided at a rate of 2.7 mL/min. The pH and the reaction temperature of the mixture were controlled to be at pH 9.5±0.2 and 35±0.1° C. respectively while using 100 g/L of sodium hydroxide. The reaction solution that overflowed was arranged to be at pH 1 by adding hydrochloric acid. A precipitated melanin was filtered followed by being washed with an aqueous solution comprising 50 g/L of sodium sulfate, so that the pH after the washing was 6. Then the melanin was dried at 70° C. for one day to give a powdered eumelanin.

Example for Producing 2

Producing a Polarizing Film

A polyvinyl alcohol (manufactured by Kuraray Co. Ltd., trade name: Kuraray Vinylon#750) was dyed at 35° C. for 3 minutes in an aqueous solution with 0.25 g/L of Chlorantine Fast Red (C.I.28160), 1.0 g/L of Solophenyl Blue 4GL (C.I.34200), and 10 g/L of sodium sulfate. This dyed film was immersed at 35° C. for 3 minutes in an aqueous solution with 2.5 g/L of nickel sulfate and 6.6 g/L of boric acid and was extended in the solution. Subsequently, the film was washed with water and dried while its tension was maintained followed by being treated by heat at 70° C. for 3 minutes to give a polarizing film.

Producing the Melanin-Containing Three-layered Laminated Body of the Present Invention Example 1

Seven parts by weight of the melanin obtained in Example for producing 1 were dissolved in 93 parts by weight of a tetrahdrofurfury methacrylate (Wako Pure Chemical Industries Ltd.). Ten parts by weight of the melanin solution were combined with 40 parts by weight of a urethane prepolymer (Toyo-Morton Ltd., trade name: Oribain BHS6020A) and 4 parts by weight of a curing agent (Toyo-Morton Ltd., trade name: Oribain BHS6020C).

The combined solution was coated on a polycarbonate film 300 microns thick (Mitsubishi Gas Chemical Co. Ltd., trade name: lupilon) using a doctor blade (Yoshimitsu Seiki Co. Ltd.). The film was placed for 10 minutes in a hot air drier at 40° C. to volatize the solvent thereof. A polycarbonate sheet 300 microns thick was laminated on the coated layer and they were adhered at a nip pressure of 4.0 kg/cm$^2$ using a laminator (MCK Co. Ltd.). After aging at 40° C. for three days, it was further cured by heating at 70° C. for three days to give a transparent three-layered laminated body that includes the melanin as the middle layer.

The middle layer that included the melanin was 25 microns (using a multilayer thickness gauge, Gunze Co. Ltd., DC-8200 type). The content of the melanin in the film was 1.8 weight %, which was well compatible with 1.7 weight % as calculated from the ratio for formulating the coating solution. The film obtained was shredded, extracted for 24 hours with a warm alkaline solution at pH 10 and 50° C., and analyzed using HPLC (Shimazu Corp., LC-10AT-VP, ODS column, eluted with a phosphate buffer). The UVA transmittance of the laminated body was 41.7% (using a spectrophotometer, JASCO Corp., V-550-type) and the UVB transmittance was 16.8%, which showed a mild property for transmitting ultraviolet rays.

Examples 2 and 3

A transparent three-layered laminated body that included a melanin as a middle layer was obtained by the same procedures as in Example 1, except that the clearance of the doctor blade was 400 microns in place of 200 microns as in Example 1. The properties of the laminated body for optical purposes of the present invention are shown in Table 1.

TABLE 1

| | Light Transmittance (Examples 2 and 3) | | | |
| --- | --- | --- | --- | --- |
| | Melanin content [weight %] | Thickness of the middle layer | UVA Transmittance | UVB Transmittance |
| Example 2 | 1.8 | 50 μm | 17.7% | 2.8% |
| Example 3 | 1.7 | 90 μm | 4.3% | 0.2% |

Example 4

A transparent three-layered laminated body that included a melanin as a middle layer was obtained by the same procedures as in Example 1, except that 10 parts by weight of a melanin were dissolved in 90 parts by weight of a tetrahydrofurfury methacrylate. The thickness of the middle layer was 25 microns (using a multilayer thickness gauge, Gunze Co. Ltd., DC-8200-type).

The content of the melanin in the melanin layer of the laminated body for optical purposes of the present invention as obtained above was 2.5 weight %, which was well compatible with 2.4 weight % as calculated from the ratio of formulating the coating solution. The UVA transmittance of the laminated body was 28.6% (using a spectrophotometer, JASCO Corp., V-550 type). The UVB transmittance was 7.8%. This showed a mild property for transmitting ultraviolet rays.

Example 5

A transparent three-layered laminated body that included a melanin as a middle layer was obtained by the same procedures as in Example 1, except for being combined with a urethane prepolymer, a curing agent, and an ethyl acetate, using 30 and 50 parts by weight of a melanin solution in place of 10 parts by weight of a melanin solution as in Example 1. The properties of the laminated body for optical purposes of the present invention are shown in Table 2.

TABLE 2

| | Light Transmittance (Example 5) | | | |
| --- | --- | --- | --- | --- |
| | Melanin content [weight %] | Thickness of the middle layer | UVA Transmittance | UVB Transmittance |
| Example 5 | 3.5 (3.4) | 31 μm | 11.4% | 1.2% |

The value within parentheses was calculated from the ratio of formulating the coating solution.

Example 6

A transparent three-layered laminated body that includes a melanin as a middle layer was obtained by the same procedures as in Example 1, except that a tetrahydrofurfuryl acrylate (Wako Pure Chemical Industries Ltd.) was used in place of a tetrahydrofurfuryl methacrylate (Wako Pure Chemical Industries Ltd.) as in Example 1. The properties of the laminated body for optical purposes of the present invention are shown in Table 3.

TABLE 3

Light Transmittance (Example 6)

|  | Melanin content [weight %] | Thickness of the middle layer | UVA Transmittance | UVB Transmittance |
|---|---|---|---|---|
| Example 6 | 1.7 (1.7) | 26 μm | 40.8% | 16.1% |

The value within parentheses was calculated from the ratio of formulating the coating solution.

Comparative Example 1

The melanin obtained in Example for producing 1 was dissolved in an aqueous ammonia solution set at a pH 8.3 to give an aqueous melanin solution. In contrast, a polyvinyl alcohol film (manufactured by Kuraray Co. Ltd., trade name: Kuraray Vinylon#750) was washed while immersing it for 5 minutes in water at 30° C. Then, the film was extended to 3.5 times its length uniaxially while immersing it in the above melanin solution set at 30° C. for 5 minutes. Subsequently, the film was immersed in an aqueous solution comprising 8 g/L of sodium sulfate. Then it was taken out while its tension was maintained followed by being dried at 70° C. for 3 minutes to give a melanin-containing polyvinyl alcohol film.

The thickness of the film was 25 microns (using a micrometer, Mitsutoyo Co. Ltd., MDQ-30 type). The content of the melanin in the film was 1.0 weight. The PVA film was dissolved in warm water and analyzed using HPLC (Shimazu Corp., LC-10AT-VP, ODS column, eluted with a phosphate buffer).

On both surfaces of the melanin-containing film, a urethane prepolymer (Toyo-Morton Ltd., trade name: Oribain BHS6020A) as a heat-curable adhesive and a curing agent (Toyo-Morton Ltd., trade name: Oribain BHS6020C) was coated. A polycarbonate sheet (Mitsubishi Gas Chemical Co. Ltd., trade name: lupilon) 300 microns thick was adhered by the same procedure as in Example 1. Then, it was cured by heating to give a laminated body comprising a melanin-containing PVA layer. The PVA layer that included the adhesive layer was 40 microns thick.

The UVA transmittance of the laminated body obtained above was 60.1% and the UVB transmittance was 36.6%. If the concentration of the melanin solution were to be increased, patches of melanin dyeing would occur. So, the impregnation level of the PVA film cannot be raised more than this. Also, the melanin solution is aged with the increase of the amount of dye used for treatment. So, it was inevitable to renew it.

Comparative Example 2

Comparative Example 2 was performed by the same procedures as in Comparative Example 1, except that the ratio of the extension of the polyvinyl alcohol was 1.7 times and the period for dyeing was 40 minutes. The UVA and UVB transmittances of the laminated body obtained above were 41.8% and 19.8%, respectively. The melanin content of the polyvinyl alcohol film was 0.7%. The film had patches of dyeing. The period for dyeing took a long time. The properties of the laminated body are shown in Table 4.

TABLE 4

Light Transmittance (Comparative Example 2)

|  | Melanin content [weight %] | Thickness of a middle layer | UVA Transmittance | UVB Transmittance |
|---|---|---|---|---|
| Comparative Example 2 | 0.7 | 54 μm | 41.8% | 19.8% |

Comparative Examples 3 and 4

Urethane-derived compositions were prepared by the same procedures as in Example 1, except a glycidyl methacrylate, a 2-ethylhexyl methacrylate, and a methyl acrylate were used in place of a tetrahydrofurfuryl methacrylate as in Example 1. They were almost insoluble in a reactive monomer, so no melanin-containing compositions were obtained.

The properties of the melanin-containing three-layered laminated body for optical purposes of the present invention obtained in Examples 1-6 and the laminated bodies in Comparative Examples 1-4 are shown in Table 5. The table clearly shows that the melanin-containing three-layered laminated bodies for optical purposes of the present invention include a high concentration of melanin and a reduced light transmittance compared to the Comparative Examples.

TABLE 5

| | Composition of the melanin solution | | | | Adhesive composition | | |
|---|---|---|---|---|---|---|---|
| | Melanin | | Reactive monomer | | Melanin solution | Urethane | |
| | Method | Amount | Species | Amount | Amount | Monomer | Curing agent |
| Example 1 | Synthesis | 7 | THFMA | 93 | 10 | 40 | 4 |
| Example 2 | Synthesis | 7 | THFMA | 93 | 10 | 40 | 4 |
| Example 3 | Synthesis | 7 | THFMA | 93 | 10 | 40 | 4 |
| Example 4 | Synthesis | 10 | THFMA | 90 | 10 | 40 | 4 |
| Example 5 | Synthesis | 7 | THFMA | 93 | 30 | 40 | 4 |
| Example 6 | Synthesis | 7 | THFA | 93 | 10 | 40 | 4 |
| Comparative Example 1 | Synthesis | | | PVA is immersed in a 1.2 g/L aqueous solution | | | |

| | | Film performance | | | |
|---|---|---|---|---|---|
| | Combination | Thickness of the melanin layer μ | Melanin content % | UVA transmittance | UVB transmittance |
| Example 1 | PC/melanin/PC | 25 | 1.8 | 41.7 | 16.8 |
| Example 2 | PC/melanin/PC | 50 | 1.8 | 17.7 | 2.8 |

TABLE 5-continued

| | | | | | |
|---|---|---|---|---|---|
| Example 3 | PC/melanin/PC | 90 | 1.7 | 4.3 | 0.2 |
| Example 4 | PC/melanin/PC | 25 | 2.5 | 28.6 | 7.8 |
| Example 5 | PC/melanin/PC | 31 | 3.5 | 11.4 | 1.2 |
| Example 6 | PC/melanin/PC | 26 | 1.7 | 40.3 | 16.1 |
| Comparative Example 1 | PC/melanin impregnated PVA/PC | 25 | 1.0 | 60.1 | 36.6 |

Example 7

Preparation of a Composition for the Melanin-Containing Laminated Body for Optical Purposes of the Present Invention A melanin-containing curable resin composition was prepared by the same procedures as in Example 1. The composition was coated on a polycarbonate sheet (Mitsubishi Gas Chemical Co. Ltd., trade name: lupilon) 300 microns thick using a doctor blade having 100 microns of clearance (Yoshimitsu Seiki Co. Ltd.). Then the film was placed for 10 minutes in a hot air drier at 40° C. to volatize the solvent thereof. The polarizing film obtained in Example for producing 2 was laminated on the coated layer and they were adhered at a nip pressure of 4.0 kg/cm$^2$ using a laminator (MCK Co. Ltd.). The thickness of the melanin layer was 25 microns. The content of the melanin of the melanin layer in the laminated body A was 1.7 weight %, which was well compatible with 1.7 weight % as calculated from the ratio of formulating the coating solution.

In contrast, 0.1 part by weight of a photochromic dye, 4-[4-[6-(4-morphonyl)-3-phenyl-3H-naphtho(2,1-b)pyran-3-yl]phenyl]-morphin (trade name: Reversacol Flame, James Robinson Ltd.) and 0.05 part by weight of an ultraviolet ray absorber (Ciba Speciality Chemicals, trade name: Tinuvin 400) were combined with 100 parts by weight of a urethane prepolymer (Toyo-Morton Ltd., trade name: Oribain BHS6020A) and 0.8 part by weight of a curing agent (Toyo-Morton Ltd., trade name: Oribain BHS6020C). The combined solution was coated on a polycarbonate sheet (Mitsubishi Gas Chemical Co. Ltd., trade name: lupilon) of 300 microns thick using a doctor blade (Yoshimitsu Seiki Co. Ltd.). The sheet was placed for 10 minutes in a hot air drier at 40° C. to volatize the solvent thereof to give a laminated body B The laminated body B as a photochromic layer was laminated on the laminated body A as a polarizing layer and they were adhered at a nip pressure of 4.0 kg/cm2 using a laminator (MCK Co. Ltd.). After aging at 40° C. for three days, it was further cured by heating at 70° C. for three days to give the transparent five-layered laminated body of the present invention, which has both polarizing and photochromic properties.

The UVA transmittance of the laminated body for optical purposes as obtained above was 0.32% (using a spectrophotometer, JASCO Corp., V-550 type) and the UVB transmittance was 0.01%. The transmittance of the visible region was 13.52% without any radiation of light and the degree of polarization was 99.8%. They were almost equal to the optical properties of the polarizing film substrate itself. Further, when 25 W/m$^2$ of light was radiated to the laminated film by a xenon lamp (SAN-EI ELECTRIC Corp., SUPERCURE-203S), the film colored. The transmittance of the visible region after 7 minutes was 9.15%. It had an excellent photochromic property.

The properties of the melanin-containing five-layered laminated body for optical purposes of the present invention obtained in Example 7 are shown in Table 6. The table clearly shows that the melanin-containing five-layered laminated bodies for optical purposes of the present invention include a high concentration of melanin, and the light transmittance became low.

TABLE 6

| | Composition of the melanin solution | | | | Adhesive composition | | |
|---|---|---|---|---|---|---|---|
| | Melanin | | Reactive monomer | | Melanin solution | Urethane | |
| | Method | Amount | Species | Amount | Amount | Monomer | Curing agent |
| Example 7 | Synthesis | 7 | THFMA | 93 | 10 | 40 | 4 |

| | | Film performance | | | |
|---|---|---|---|---|---|
| | Combination | Thickness of the melanin layer μ | Melanin content % | UVA transmittance | UVB transmittance |
| Example 7 | PC/melanin/PC | 25 | 1.8 | 41.7 | 16.8 |

INDUSTRIAL APPLICABILITY

As seen by the above, the laminated body of the present invention is useful for an optical product, such as a polarizing lens, a polarizing plate, sunglasses, goggles, glass for automobiles, window glass, a sunvisor, etc., which are excellent in protecting eyes from ultraviolet rays.

SUMMARY

Problem to be Solved

The present invention provides a laminated body for optical purposes that includes a melanin-containing layer and an optical product that includes the laminate. In particular, the invention provides a laminated body which includes a melanin-containing layer, and an optical product which includes the laminate, of which the melanin concentration is high. They are excellent in the capacity to protect eyes from ultraviolet rays.

Means to Solve the Problem

The laminated body of the present invention is one comprising a melanin-including layer, wherein said melanin layer is formed by curing a composition that comprises at least a melanin, a polymerizable monomer, and a urethane-derived composition. The composition for the laminated body of the present invention is used for producing the laminated body. The composition comprises at least a melanin, a polymerizable monomer, and a urethane-derived composition. The optical product of the present invention is formed while including the above laminated body.

The invention claimed is:

1. A laminated body for optical purposes comprising an adhesive melanin-containing layer, wherein said adhesive melanin-containing layer is formed by curing a composition that comprises melanin, a tetrahydrofurfuryl(meth)acrylate, and a urethane-derived composition.

2. A laminated body for optical purposes according to claim 1, wherein the content of the adhesive melanin-containing layer of the melanin layer is 1.5% or more by weight.

3. A laminated body for optical purposes according to claim 1 or 2, wherein said melanin is any one selected from the group consisting of an eumelanin, a pheomelanin, and an allomelanin.

4. A laminated body for optical purposes according to claim 1, wherein the urethane-derived composition is a thermal-curable composition that consists of a polyurethane polymer and a curing agent.

5. A laminated body for optical purposes according to claim 1 that consists of an adhesive melanin-containing layer, and two transparent resin layers between which the adhesive melanin-containing layer is held.

6. A laminated body for optical purposes according to claim 1 that consists of a polarizing film, an adhesive melanin-containing layer and a photochromic layer between which the polarizing film is held, and two transparent resin layers between which the adhesive melanin-containing layer and the photochromic are held.

7. A laminated body for optical purposes according to claim 5, wherein the transparent resin layers are at least one selected from the group consisting of a polycarbonate resin, a cellulose resin, an alicyclic polyolefin resin, and a polyester resin.

8. A laminated body for optical purposes according to claim 5, wherein the transparent resin layers are polycarbonate resins.

9. A laminated body for optical purposes according to claim 6, wherein the transparent resin layers are at least one selected from the group consisting of a polycarbonate resin, a cellulose resin, an alicyclic polyolefin resin, and a polyester resin.

10. A laminated body for optical purposes according to claim 6, wherein the transparent resin layers are polycarbonate resins.

11. A composition for producing the laminated body for optical purposes according to claim 1, wherein the composition comprises a melanin, a tetrahydrofurfuryl(meth)acrylate, and a urethane composition.

12. A composition for producing the laminated body for optical purposes according to claim 11, wherein the melanin is any one selected from the group consisting of an eumelanin, a pheomelanin, and an allomelanin.

13. A composition for producing the laminated body for optical purposes according to claim 11, wherein the urethane composition is a thermal curable composition which consists of a polyurethane polymer and a curing agent.

14. A melanin-containing optical product wherein it is formed so that it includes the laminated body for optical purposes of claim 1.

15. A melanin-containing optical product according to claim 14 that is any one selected from the group consisting of a polarizing lens, a polarizing plate, sunglasses, goggles, glass for automobiles, window glass, and a sunvisor.

* * * * *